US012610004B2

(12) United States Patent
She et al.

(10) Patent No.: US 12,610,004 B2
(45) Date of Patent: Apr. 21, 2026

(54) ELECTRONIC DEVICE WITH SLIDABLE FLEXIBLE DISPLAY SCREEN

(71) Applicant: VIVO MOBILE COMMUNICATION CO., LTD., Guangdong (CN)

(72) Inventors: Jianfeng She, Guangdong (CN); Wenchao Pan, Guangdong (CN); Xu Chen, Guangdong (CN); Qingbin Cai, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 251 days.

(21) Appl. No.: 18/483,838

(22) Filed: Oct. 10, 2023

(65) Prior Publication Data

US 2024/0040026 A1      Feb. 1, 2024

Related U.S. Application Data

(63) Continuation of application No. PCT/CN2022/086137, filed on Apr. 11, 2022.

(30) Foreign Application Priority Data

Apr. 15, 2021    (CN) .......................... 202110407033.8

(51) Int. Cl.
  *H04M 1/02*          (2006.01)
(52) U.S. Cl.
  CPC ....... *H04M 1/0268* (2013.01); *H04M 1/0237* (2013.01)
(58) Field of Classification Search
  CPC . H04M 1/0237; H04M 1/0268; G06F 1/1624; G06F 1/1652; H05K 5/0018; H05K 5/0217

USPC ...................................................... 361/679.01
See application file for complete search history.

(56) References Cited

U.S. PATENT DOCUMENTS

| | | | | |
|---|---|---|---|---|
| 11,314,285 | B2 * | 4/2022 | Feng ..................... | G06F 1/1652 |
| 11,849,549 | B2 * | 12/2023 | Feng ..................... | G06F 1/1681 |
| 2020/0264660 | A1 * | 8/2020 | Song ................... | H04M 1/0268 |
| 2021/0044683 | A1 | 2/2021 | He et al. | |
| 2022/0104369 | A1 | 3/2022 | Yao | |

(Continued)

FOREIGN PATENT DOCUMENTS

| | | |
|---|---|---|
| CN | 108259649 A | 7/2018 |
| CN | 110512266 A | 11/2019 |

(Continued)

*Primary Examiner* — Imani N Hayman
*Assistant Examiner* — Ross Terry Mularski
(74) *Attorney, Agent, or Firm* — Price Heneveld LLP

(57) ABSTRACT

An electronic device includes: a casing, where the casing has a first surface and a second surface, the casing includes a top frame and a bottom frame; a flexible display screen, where an inner surface of the flexible display screen is provided with a plurality of transmission holes arranged at intervals, and the flexible display screen includes a first part and a second part that are connected; and a drive mechanism, where the drive mechanism is arranged in the casing, the drive mechanism includes a drive source and a rotating member, the rotating member is provided with a plurality of transmission parts, the transmission part cooperates with the transmission hole, and the driving source drives the flexible display screen to switch between a first state and a second state.

10 Claims, 5 Drawing Sheets

(56)                    References Cited

U.S. PATENT DOCUMENTS

| 2023/0156105 | A1 | 5/2023 | Feng |
| 2023/0259168 | A1 | 8/2023 | Gu et al. |

FOREIGN PATENT DOCUMENTS

| CN | 111508374 | A | 8/2020 |
| CN | 111510536 | A | 8/2020 |
| CN | 212010177 | U | 11/2020 |
| CN | 112164312 | A | 1/2021 |
| CN | 112291954 | A | 1/2021 |
| CN | 113099008 | A | 7/2021 |
| JP | 2011221189 | A | 11/2011 |

* cited by examiner

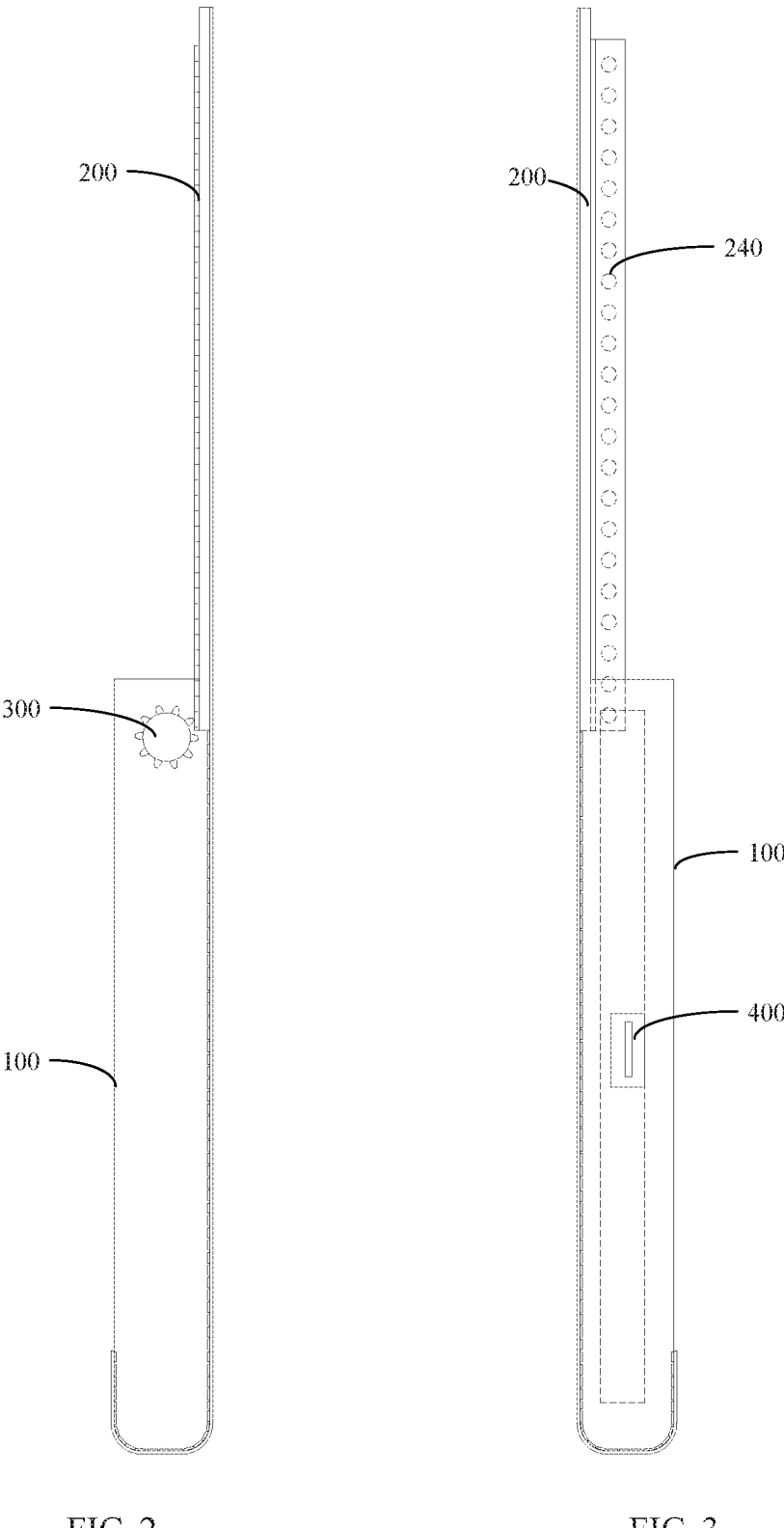
FIG. 2                    FIG. 3

ELECTRONIC DEVICE WITH SLIDABLE FLEXIBLE DISPLAY SCREEN

CROSS-REFERENCE TO RELATED APPLICATIONS

The present application is a continuation application of International Application No. PCT/CN2022/086137, filed on Apr. 11, 2022. International Application No. PCT/CN2022/086137 claims priority to Chinese Patent Application No. 202110407033.8, filed on Apr. 15, 2021 in China. Each of the above-listed applications is incorporated herein by reference in its entirety.

TECHNICAL FIELD

This application belongs to the field of communication technologies, and in particular, to an electronic device.

BACKGROUND

With the development of communication technologies, electronic devices constantly develop towards full screens, and sizes of display screens become larger and larger. Larger display screens can not only improve the aesthetics of electronic devices, but also bring better vision effect to users, for example, when playing games, browsing information or watching movies, users can have better experience.

However, as the size of the display screen becomes larger, the overall size of the electronic device becomes larger, which occupies a larger storage space, thereby causing inconvenience for users to carry. At the same time, as the overall size of the electronic device becomes larger, correspondingly its weight also becomes higher, which brings more inconvenience to the user operation. In order to solve this problem, foldable electronic devices have appeared on the market at present. A folding method of a display screen includes inner folding and outer folding. However, regardless of whether the display screen adopts an inner folding or outer folding structure, the overall thickness of the electronic device is relatively large.

SUMMARY

The embodiments of the present application provide an electronic device, including:

a casing, where the casing has a first surface and a second surface that are arranged away from each other, the casing includes a top frame and a bottom frame, the top frame and the bottom frame are arranged away from each other in a first direction, the casing is provided with a first chute and a second chute, the first chute and the second chute are arranged in parallel, the first chute and the second chute are arranged at intervals in the first direction, the first chute is arranged on the top frame, and the second chute is arranged between the top frame and the bottom frame;

a flexible display screen, where the flexible display screen is slidably fitted with the first chute and the second chute, an inner surface of the flexible display screen is provided with a plurality of transmission holes arranged at intervals, and the flexible display screen includes a first part and a second part that are connected; and a drive mechanism, where the drive mechanism is arranged in the casing, the drive mechanism includes a drive source and a rotating member, the rotating member is provided with a plurality of transmission parts, the plurality of transmission parts are arranged around a rotation axis of the rotating member, the transmission part cooperates with the transmission hole, and the driving source drives the flexible display screen to switch between a first state and a second state through the transmission part;

where in a case that the flexible display screen is in the first state, the first part is located on a side where the first surface is located, and the second part is located on a side where the second surface is located; and in a case that the flexible display screen is in the second state, both the first part and the second part are located on the side where the first surface is located; and the first direction is perpendicular to a sliding direction of the flexible display screen.

BRIEF DESCRIPTION OF DRAWINGS

FIG. 1 to FIG. 3 are structural schematic diagrams of an electronic device under different viewing angles when a flexible display screen is in a first state according to embodiments of the present application;

Figure 1:
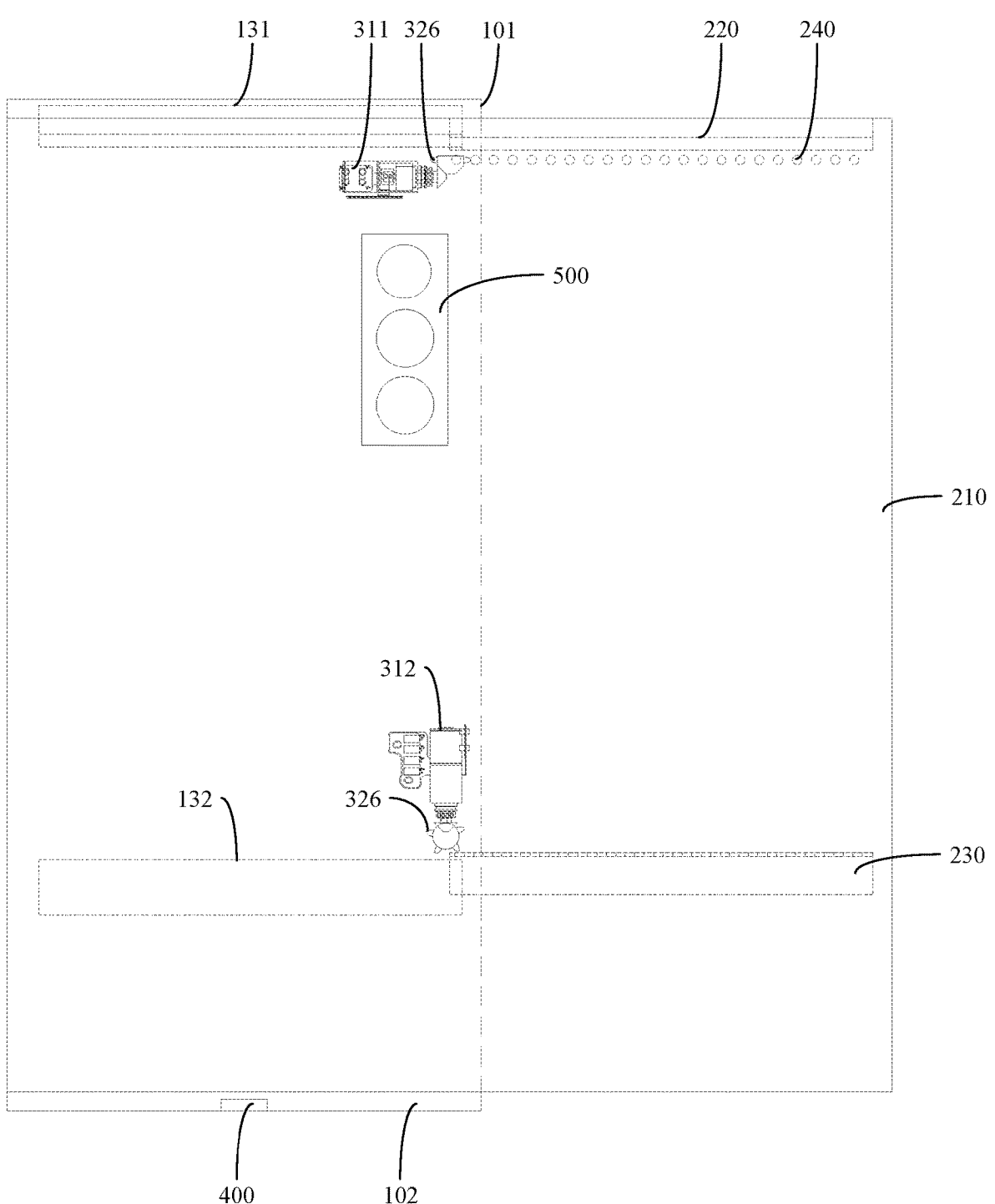

Reference numerals in the accompanying drawings are as follows:

100—casing, 101—top frame, 102—bottom frame, 110—first surface, 120—second surface, 131—first chute, 131a—first inner wall surface, 131b—second inner wall surface, 132—second chute, 132a—third inner wall surface, 132b—fourth inner wall surface;

200—flexible display screen, 210—display screen body, 220—first guide member, 221—first plate segment, 222—second plate segment, 223—first sliding part, 230—second guide member, 231—third plate segment, 232—fourth plate segment, 233—second sliding part, 240—transmission hole, 250—support member, 260—first part, 270—second part;

300—drive mechanism, 310—drive source, 311—first drive source, 312—second drive source, 320—rotating member, 321—first bevel gear, 322—second bevel gear, 323—third bevel gear, 324—fourth bevel gear, 325—bearing, 326—transmission part;

400—socket;

500—camera module.

DESCRIPTION OF EMBODIMENTS

The following clearly and completely describes the technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application without creative efforts shall fall within the protection scope of this application.

The terms "first", "second", and the like in the description and the claims of this application are used to distinguish between similar objects, and do not need to be used to describe a specific order or sequence. It should be understood that data used in this way may be interchangeable in appropriate cases, so that the embodiments of this application can be implemented in a sequence other than those shown or described herein. In addition, in the specification and the claims, "and/or" represents at least one of connected objects, and a character "/" generally represents an "or" relationship between associated objects.

With reference to the accompanying drawings, an electronic device provided in the embodiments of this application will be described in detail by using specific examples and application scenarios thereof.

Figure 4:
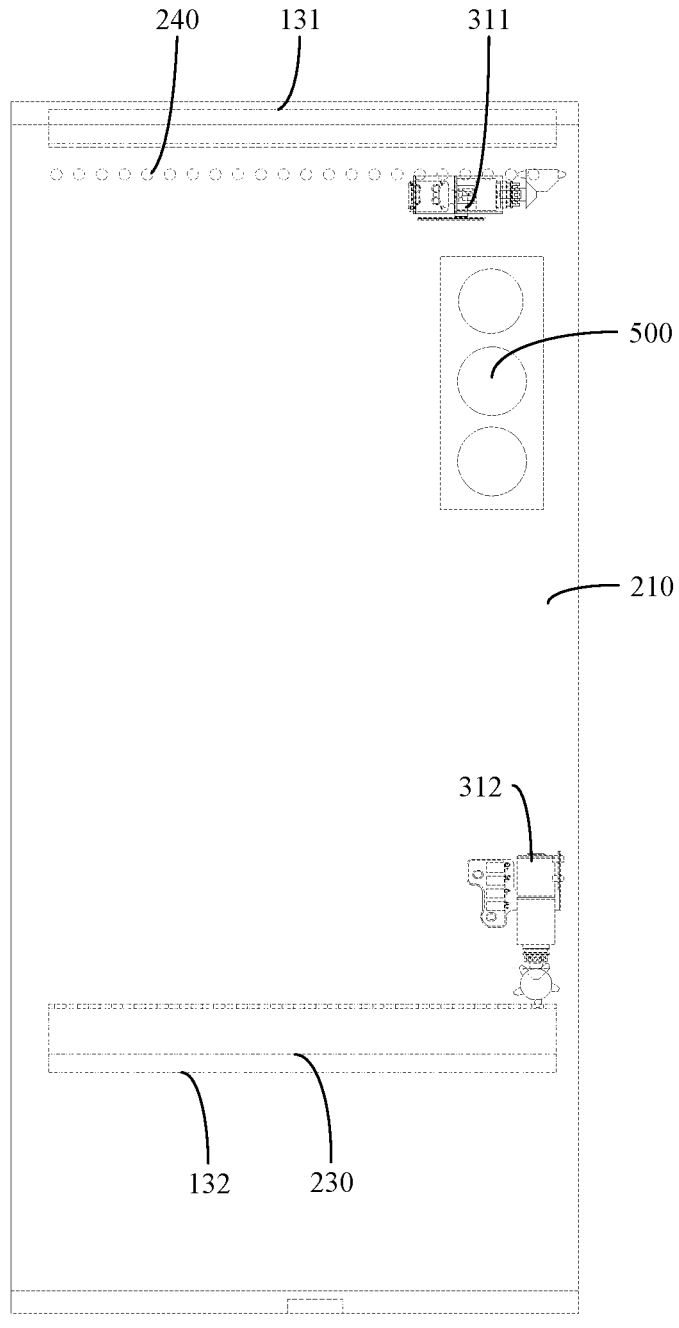
FIG. 4 to FIG. 6 are structural schematic diagrams of an electronic device under different viewing angles when a flexible display screen is in a second state according to embodiments of the present application.
Figure 5:
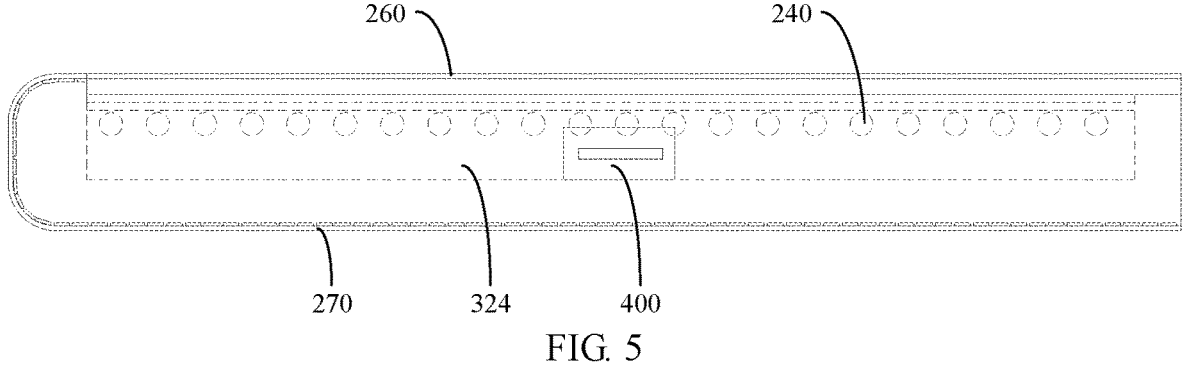
Figure 6:
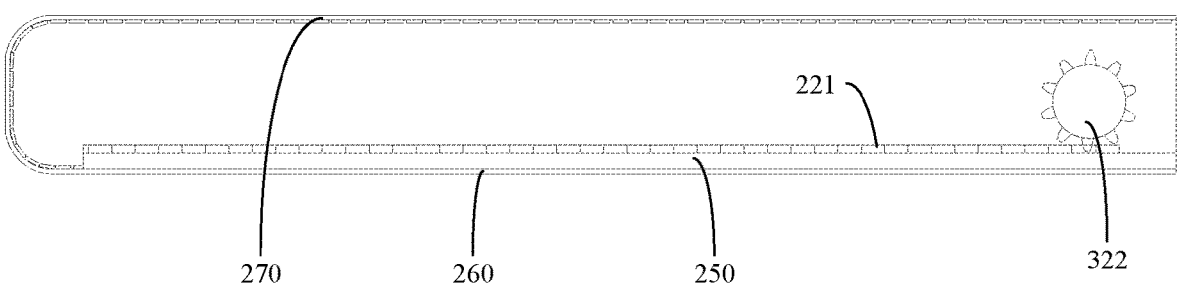
Figure 7:
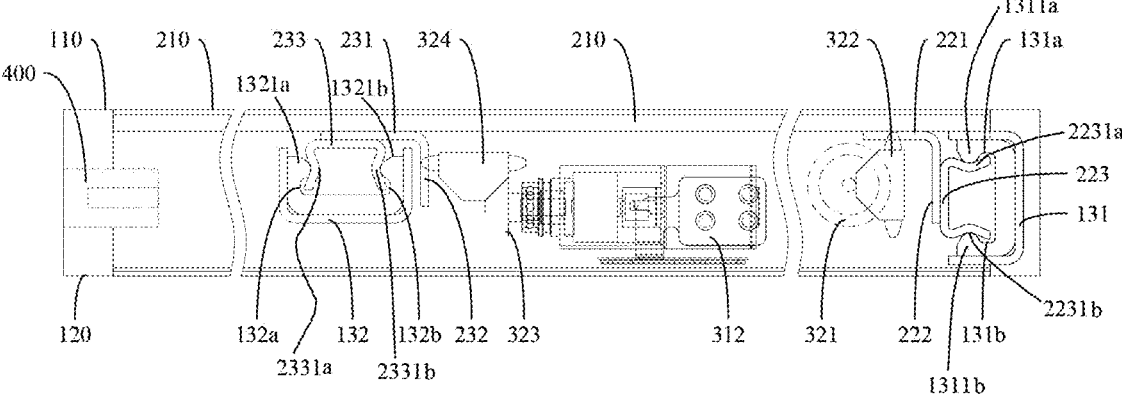
FIG. 7 is a schematic diagram of a partial structure of an electronic device according to an embodiment of the present application.
Figure 8:
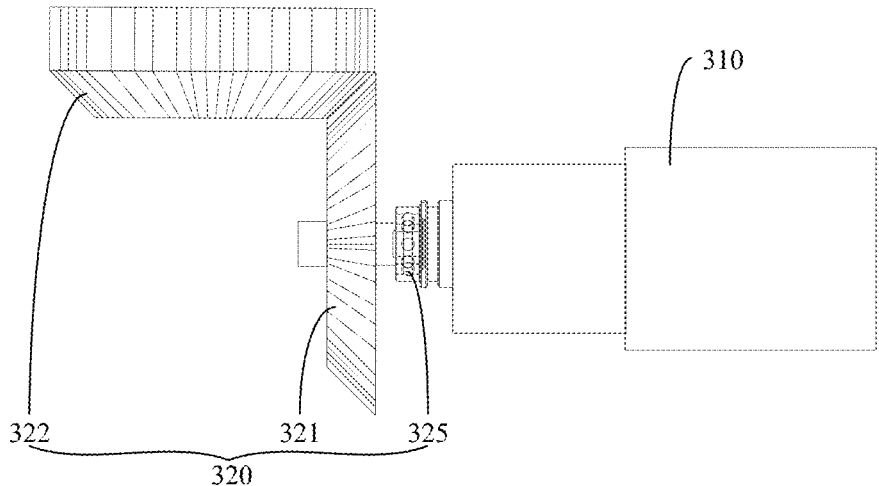
FIG. 8 is a schematic structural diagram of a drive mechanism according to an embodiment of the present application.

Referring to FIG. 1 to FIG. 8, an embodiment of the present application discloses an electronic device, which includes a casing 100, a flexible display screen 200, a drive mechanism 300, a socket 400, and a camera module 500.

The casing 100 is a basic component of the electronic device, which can provide a foundation for other structures of the electronic device. The casing 100 has a first surface 110 and a second surface 120 that are arranged away from each other. The first surface 110 here can be the front surface of the electronic device and the second surface 120 may be the back surface of the electronic device, and the camera module 500 may be arranged on the second surface 120.

The flexible display screen 200 is arranged on the casing 100, and the flexible display screen 200 is slidably fitted with the casing 100, that is, the flexible display screen 200 can slide relative to the casing 100. The inner surface of the flexible display screen 200 is provided with a plurality of transmission holes 240 arranged at intervals. Optionally, the transmission holes 240 may be square transmission holes, circular transmission holes, etc., which are not specifically limited in this embodiment of the present application. The flexible display screen 200 includes a first part 260 and a second part 270 that are connected, where the first part 260 and the second part 270 are arranged along a sliding direction of the flexible display screen 200.

The drive mechanism 300 is arranged in the casing 100, and the drive mechanism 300 includes a driving source 310 and a rotating member 320. Optionally, the driving source 310 can be a motor, an air cylinder, a hydraulic cylinder, piezoelectric ceramics, a shape memory alloy, a coil spring, etc. The motor has the characteristics of small size, high efficiency, and convenient control; the air cylinder and hydraulic cylinder have the characteristics of large output force and stable and reliable performance; and the piezoelectric ceramics, shape memory alloy, and coil spring have the characteristics of being green and environmentally friendly. The embodiment of the present application does not limit the specific form of the driving source 310. The rotating member 320 can rotate under the drive of the driving source 310, and is provided with a plurality of transmission parts 326, and the plurality of transmission parts 326 are arranged around the rotation axis of the rotating member 320. It should be noted that the rotation axis here refers to the rotation axis of the part of the rotating member 320 that is directly fitted with the transmission hole 240. The transmission part 326 cooperates with the transmission hole 240, in other words, during the rotation of the rotating member 320, different transmission parts 326 cooperate with different transmission holes 240, thereby driving the flexible display screen 200 to slide. Optionally, the transmission part 326 may be a columnar structure, and accordingly the transmission hole 240 is a circular transmission hole, and the transmission part 326 may be inserted into the transmission hole 240 to cooperate with the transmission hole 240. The driving source 310 drives the flexible display screen 200 to switch between the first state and the second state through the transmission part 326. Specifically, when the flexible display screen 200 is in the first state, that is, when the flexible display screen 200 is in the retracted state, the first part 260 is located on the side where the first surface 110 is located, and the second part 270 is located on the side where the second surface 120 is located. In this case, the effective display area of the flexible display screen 200 of the electronic device is small, which can meet the needs of users for calls and information viewing, and the overall size of the electronic device is small and the electronic device is easy to carry. When the flexible display screen 200 is in the second state, that is, when the electronic device is in an extended state, both the first part 260 and the second part 270 are located on the side where the first surface 110 is located. In this case, the first part 260 and the second part 270 together form a larger display area, so that the effective display area of the flexible display screen 200 of the electronic device is larger, so that users can watch movies and play games on a large screen, so as to provide users with better experience.

The casing 100 may include a top frame 101 and a bottom frame 102, and the top frame 101 and the bottom frame 102 are arranged away from each other in a first direction, where the first direction is perpendicular to the sliding direction of the flexible display screen 200. The casing 100 is provided with a first chute 131 and a second chute 132, the first chute 131 and the second chute 132 are arranged in parallel, the first chute 131 and the second chute 132 are arranged at intervals in the first direction, the first chute 131 is arranged on the top frame 101, the second chute 132 is arranged between the top frame 101 and the bottom frame 102, and the flexible display screen 200 is slidably fitted with the first chute 131 and the second chute 132 respectively, that is, the arrangement direction of the first chute 131 and the second chute 132 is adapted to the sliding direction of the flexible display screen 200, so that the first chute 131 and the second chute 132 can be used for the sliding of the flexible display screen 200.

In the embodiments of the present application, the flexible display screen 200 is slidably fitted with the casing 100, the inner surface of the flexible display screen 200 is provided with a plurality of transmission holes 240 arranged at intervals, and the transmission part 326 arranged on the rotating member 320 is fitted with the transmission hole 240, so that the drive source 310 drives the flexible display screen 200 to switch between the first state and the second state through the transmission part 326. The embodiments do not need to arrange the electronic device as two foldable parts, and only need to change the state of the flexible display screen 200 to change the display area, which can reduce the overall thickness of the electronic device. Therefore, the embodiments of the present application can solve the existing problem of the large thickness of the electronic device. In addition, the embodiment of the present application uses the transmission hole 240 to realize the transmission, and the transmission hole 240 does not occupy any additional space, so the space occupied by the entire drive mechanism is smaller.

In addition, the second chute 132 is arranged between the top frame 101 and the bottom frame 102, and therefore there is a certain distance between the second chute 132 and the bottom frame 102, so that the second chute 132 does not affect components to be arranged at the bottom frame 102.

In an optional embodiment, the bottom frame 102 may be provided with a socket 400, and the socket 400 and the second chute 132 are arranged at intervals in the first direction. The socket 400 can be used to implement functions such as charging and data transmission. Optionally, the socket 400 can be a USB socket. After adopting the above-mentioned structure, the arrangement position of the socket 400 is not affected by the second chute 132, and therefore the socket 400 can be arranged in the middle of the bottom frame 102. This arrangement method is more in line with user usage habits, thereby providing users with better experience.

Only one drive mechanism 300 may be provided. In another optional embodiment, the number of drive mechanisms 300 is at least two, including a first drive mechanism and a second drive mechanism. The flexible display screen includes a display screen body 210, a second guide member 220, and a second guide member 230, both the first guide member 220 and the second guide member 230 are connected to the display screen body 210, and the first guide member 220 and the second guide member 230 and the display screen body 210 can be arranged as an integrated structure and can also be arranged as a split structure. If they are arranged as an integrated structure, when the display screen body 210 or the first guide member 220 or the second guide member 230 is damaged, it is inconvenient to maintain. Therefore, optionally, both the first guide member 220 and the second guide member 230 are arranged in separation to and connected to the display screen body 210, and further optionally, both the first guide member 220 and the second guide member 230 can be connected to the display screen body 210 in a manner such as bonding, which is not specifically limited in this embodiment of the present application. Both the first guide member 220 and the second guide member 230 are provided with transmission holes 240, the first guide member 220 is slidably fitted with the first chute 131, the second guide member 230 is slidably fitted with the second chute 132, the first drive mechanism is connected to the first guide member 220 through the transmission hole 240, and the second drive mechanism is connected to the second guide member 230 through the transmission hole 240. In this case, the first drive mechanism and the second drive mechanism simultaneously output the driving force, thereby driving the flexible display screen 200 to slide, and therefore the driving force received by the flexible display screen 200 is greater, and there are more places where the driving force acts, so that the drive mechanism 300 can drive the flexible display screen 200 to slide more smoothly.

The first guide member 220 can be a flat plate structure, which can be directly slidably fitted with the first chute 131, thereby driving the flexible display screen 200 to slide, but the contact area between the flat plate structure and the casing 100 is small, and it is unstable during the sliding process. Therefore, optionally, the first guide member 220 includes a first plate segment 221 and a second plate segment 222 connected vertically, the first plate segment 221 is attached to the display screen body 210, and the first plate segment 221 is provided with a transmission hole 240. When the flexible display screen 200 switches between the first state and the second state, the first guide member 220 slides along the first chute 131, and in this case, the first chute 131 provides a guiding function for the first guide member 220, and a larger contact area can be formed between them, thereby improving the stability of the flexible display screen 200 during the sliding process.

Further, the driving source 310 of the first drive mechanism is a first driving source 311, the rotating member 320 of the first drive mechanism includes a first bevel gear 321 and a second bevel gear 322, and the first driving source 311 is provided with a first output shaft, the first bevel gear 321 is arranged coaxially with the first output shaft, the second bevel gear 322 is meshed with the first bevel gear 321, and the second bevel gear 322 is meshed with the transmission hole 240. In this case, the transmission part 326 may include the tooth of the second bevel gear 322. Compared with the manner of transmission through spur gears, this embodiment uses bevel gears for transmission, and the first bevel gear 321 and the second bevel gear 322 can change the direction of power transmission, so that the arrangement of the first driving source 311 is not limited, so as to facilitate the arrangement of the first driving source 311. In addition, this transmission manner has the characteristics of compact structure, high efficiency and long service life. Therefore, the use of this transmission manner can facilitate the layout of other structures in the casing 100, and make the internal structure of the casing 100 more compact.

The second guide member 230 can be a flat plate structure, which can be directly slidably fitted with the second chute 132, thereby driving the flexible display screen 200 to slide, but the contact area between the flat plate structure and the casing 100 is small, and it is unstable during the sliding process. Therefore, optionally, the second guide member 230 includes a third plate segment 231 and a fourth plate segment 232 connected vertically, the third plate segment 231 is attached to the display screen body 210, and the fourth plate segment 232 is provided with a transmission hole 240. When the flexible display screen 200 switches between the first state and the second state, the second guide member 230 slides along the second chute 132, and in this case, the second chute 132 provides a guiding function for the second guide member 230, and a larger contact area can be formed between them, thereby improving the stability of the flexible display screen 200 during the sliding process.

Further, the driving source 310 of the second drive mechanism is a second driving source 312, the rotating member 320 of the second drive mechanism includes a third bevel gear 323 and a fourth bevel gear 324, and the second driving source 312 is provided with a second output shaft, the third bevel gear 323 is arranged coaxially with the second output shaft, the fourth bevel gear 324 is meshed with the third bevel gear 323, and the fourth bevel gear 324 is meshed with the transmission hole 240. In this case, the transmission part 326 may include the tooth of the fourth bevel gear 324. Compared with the manner of transmission through spur gears, this embodiment uses bevel gears for transmission, and the third bevel gear 323 and the fourth bevel gear 324 can change the direction of power transmission, so that the arrangement of the second driving source 312 is not limited, so as to facilitate the arrangement of the second driving source 312. In addition, this transmission manner has the characteristics of compact structure, high efficiency and long service life. Therefore, the use of this transmission manner can facilitate the layout of other structures in the casing 100, and make the internal structure of the casing 100 more compact.

Further optionally, the drive mechanism also includes a reducer, which can change the transmission ratio of the first output shaft and the second output shaft, and expand the variation range of the torque and rotational speed of the first output shaft and the second output shaft to adapt to the conditions required for the flexible display screen 200 to switch between the first state and the second state, to enable the driving source 310 to work in a better working condition.

Further optionally, the rotating member 320 also includes a bearing 325. Optionally, the bearing 325 can be a ball bearing to withstand a relatively large load. Of course, it can also be other types of bearings 325. This embodiment of the present application does not specifically limit this. At least one bearing 325 can be arranged between the first bevel gear 321 and the reducer, and/or between the third bevel gear 323 and the reducer, and this bearing 325 can provide a larger supporting force, making the entire drive mechanism 300 more stable to run.

Optionally, the opening side of the first chute 131 may face the opening side of the second chute 132. In another optional embodiment, the opening side of the first chute 131 faces the second guide member 230, and the opening side of the second chute 132 faces the display screen body 210. The first guide member 220 also includes a first sliding part 223, the second guide member 230 also includes a second sliding part 233, the first sliding part 223 is arranged on the second plate segment 222, the first sliding part 223 is fitted with the first chute 131, the opening side of the first sliding part 223 faces the bottom surface of the first chute 131, the second sliding part 233 is arranged on the third plate segment 231, the second sliding part 233 is fitted with the second chute 132, and the opening side of the second sliding part 233 faces the bottom surface of the second chute 132. In this embodiment, since the opening sides of the first chute 131 and the second chute 132 have different orientations, correspondingly the structures of the first guide member 220 and the second guide member 230 can be different, so as to better adapt to the layout of other components of the electronic device and facilitate the structural design of the electronic device. In addition, the first plate segment 221 is provided with a transmission hole 240, the second plate segment 222 is provided with a first sliding part 223, the third plate segment 231 is provided with a second sliding part 233, and the fourth plate segment 232 is provided with a transmission hole 240. That is, the transmission hole 240 and the first sliding part 223 are arranged on different parts of the first guide member 220, and the transmission hole 240 and the second sliding part 233 are arranged on different parts of the second guide member 230, thereby preventing stress concentration in the first guide member 220 and the second guide member 230, so as to prolong the service life of the first guide member 220 and the second guide member 230. In addition, since the first sliding part 223 and the second sliding part 233 are groove-shaped structures, the contact area between the first sliding part 223 and the first chute 131 and the contact area between the second sliding part 233 and the second chute 132 are large, so that the flexible display screen 200 is more stable during the sliding process.

In a further optional embodiment, the first chute 131 has a first inner wall surface 131a and a second inner wall surface 131b that are opposite to each other, the first inner wall surface 131a is provided with a first limiting protrusion 1311a, the second inner wall surface 131b is provided with a second limiting protrusion 1311b, the first sliding part 223 has a first limiting groove 2231a and a second limiting groove 2231b arranged opposite to each other, the first limiting protrusion is fitted with the first limiting groove in a limiting manner, and the second limiting protrusion is fitted with the second limiting groove in a limiting manner, to prevent the first sliding part 223 from detaching from the first chute 131. Similarly, the second chute 132 has a third inner wall surface 132a and a fourth inner wall surface 132b that are opposite to each other, the third inner wall surface 132a is provided with a third limiting protrusion 1321a, the fourth inner wall surface 132b is provided with a fourth limiting protrusion 1321b, the second sliding part 233 has a third limiting groove 2331a and a fourth limiting groove 2331b arranged opposite to each other, the third limiting protrusion is fitted with the third limiting groove in a limiting manner, and the fourth limiting protrusion is fitted with the fourth limiting groove in a limiting manner, to prevent the second sliding part 233 from detaching from the second chute 132. It can be seen from this that the use of this limiting structure in the embodiments of the present application can further ensure that the first guide member 220 always slides precisely along the preset direction of the first chute 131 and the second chute 132, avoiding the offset of the flexible display screen 200, and this limiting structure is simpler.

In an optional embodiment, the flexible display screen further includes a support member 250, and the edge of the support member 250 extends to the edge of the display screen body 210, that is, the shape of the support member 250 is the same as that of the display screen body 210, and the area of the support member 250 is substantially equal to that of the display screen body 210. Both the first guide member 220 and the second guide member 230 are connected to the display screen body 210 of the support member 250. In the direction perpendicular to the second part 270 (that is, the thickness direction of the electronic device), orthographic projections of the first guide member 220 and the second guide member 230 are both located within the orthographic projection of the support member 250, that is, the area of the first guide member 220 and the area of the second guide member 230 are both smaller than the area of the support member 250. In this case, the area of the support member 250 is greater than the area of the first guide member 220 and the area of the second guide member 230, and therefore, the support member 250 provides support for the entire display region of the display screen body 210, so that the display screen body 210 presents a better display effect, and this facilitates the user to implement touch operation. In addition, the area of the first guide member 220 and the area of the second guide member 230 are smaller than the area of the support member 250, and therefore spaces can be provided around the first guide member 220 and the second guide member 230, and these spaces can be used to arrange structures (such as the first sliding part 223 and the second sliding part 233) that are fitted with the chute, which can reduce the difficulty of structural design of the electronic device.

In a further optional embodiment, the support member 250 includes a rigid part, and when the flexible display screen 200 is in the second state, the rigid part protrudes relative to the casing 100, that is, when the flexible display screen 200 is in the extended state, the part corresponding to the protruding part of the flexible display screen 200 in the support member 250 can be set as a rigid part, while the other part of the flexible display screen 200 can be set as a flexible part, so that the flexible display screen 200 can be bent during the sliding process. When the flexible display screen 200 is in the second state, since the rigid part has a stronger supporting effect, the rigid part protrudes out of the casing 100, and can provide a strong supporting force for the display screen body 210, so that the part is not easy to be broken. In addition, the rigid part can enable the user to perform touch operations more powerfully in entertainment, movie viewing or game scenarios, while maintaining the flatness of the display screen body 210 to obtain better user experience.

In an optional embodiment, the arrangement direction of the transmission holes 240 of the first guide member 220 is parallel to the sliding direction of the flexible display screen 200, when the driving source 310 drives the flexible display screen 200 to switch between the first state and the second state, the transmission part 326 is fitted with the transmission hole 240, and the direction of the driving force output by the driving source 310 is the arrangement direction of each transmission hole 240, thereby driving the flexible display screen 200 to slide. In this case, the drive mechanism 300 can use a smaller driving force to change the effective display area of the flexible display screen 200. Therefore, this arrangement of the transmission holes 240 can improve the working efficiency of the driving source 310, and at the same time, this arrangement is relatively simple, which is beneficial to the structural design of the rotating member 320. Similarly, the arrangement direction of the transmission holes 240 of the second guide member 230 is parallel to the sliding direction of the flexible display screen 200.

The electronic device disclosed in this embodiment of the present application may be a smart phone, a tablet computer, an ebook reader, a wearable device (for example, a smart watch), a video game console, and the like. A specific type of the electronic device is not limited in this embodiment of the present application.

The embodiments of this application are described above with reference to the accompanying drawings, but this application is not limited to the above specific implementations, and the above specific implementations are only illustrative and not restrictive. Under the enlightenment of this application, those of ordinary skill in the art can make many forms without departing from the purpose of this application and the protection scope of the claims, all of which fall within the protection of this application.

What is claimed is:

1. An electronic device, comprising:

a casing, wherein the casing has a first surface and a second surface that are arranged away from each other, the casing comprises a top frame and a bottom frame, the top frame and the bottom frame are arranged away from each other in a first direction, the casing is provided with a first chute and a second chute, the first chute and the second chute are arranged in parallel, the first chute and the second chute are arranged at intervals in the first direction, the first chute is arranged on the top frame, and the second chute is arranged between the top frame and the bottom frame;

a flexible display screen, wherein the flexible display screen is slidably fitted with the first chute and the second chute, an inner surface of the flexible display screen is provided with a plurality of transmission holes arranged at intervals, and the flexible display screen comprises a first part and a second part that are connected; and a drive mechanism, wherein the drive mechanism is arranged in the casing, the drive mechanism comprises a drive source and a rotating member, the rotating member is provided with a plurality of transmission parts, the plurality of transmission parts are arranged around a rotation axis of the rotating member, the transmission part cooperates with the transmission hole, and the driving source drives the flexible display screen to switch between a first state and a second state through the transmission part;

wherein in a case that the flexible display screen is in the first state, the first part is located on a side where the first surface is located, and the second part is located on a side where the second surface is located; and in a case that the flexible display screen is in the second state, both the first part and the second part are located on the side where the first surface is located; and the first direction is perpendicular to a sliding direction of the flexible display screen;

wherein a number of drive mechanisms is at least two, comprising a first drive mechanism and a second drive mechanism, the flexible display screen comprises a display screen body, a first guide member, and a second guide member, the first guide member and the second guide member are both connected to the display screen body, the first guide member and the second guide member are both provided with the transmission hole, the first guide member is slidably fitted with the first chute, the second guide member is slidably fitted with the second chute, the first drive mechanism is connected to the first guide member through the transmission hole, and the second drive mechanism is connected to the second guide member through the transmission hole.

2. The electronic device according to claim 1, wherein the first guide member comprises a first plate segment and a second plate segment connected vertically, the first plate segment is attached to the display screen body, and the first plate segment is provided with the transmission hole.

3. The electronic device according to claim 2, wherein the driving source of the first drive mechanism is a first driving source, the rotating member of the first drive mechanism comprises a first bevel gear and a second bevel gear, and the first driving source is provided with a first output shaft, the first bevel gear is arranged coaxially with the first output shaft, the second bevel gear is meshed with the first bevel gear, and the second bevel gear is meshed with the transmission hole.

4. The electronic device according to claim 2, wherein the second guide member comprises a third plate segment and a fourth plate segment connected vertically, the third plate segment is attached to the display screen body, and the fourth plate segment is provided with the transmission hole.

5. The electronic device according to claim 4, wherein the driving source of the second drive mechanism is a second driving source, the rotating member of the second drive mechanism comprises a third bevel gear and a fourth bevel gear, and the second driving source is provided with a second output shaft, the third bevel gear is arranged coaxially with the second output shaft, the fourth bevel gear is meshed with the third bevel gear, and the fourth bevel gear is meshed with the transmission hole.

6. The electronic device according to claim 4, wherein an opening side of the first chute faces the second guide member, and an opening side of the second chute faces the display screen body; and the first guide member further comprises a first sliding part, the second guide member further comprises a second sliding part, the first sliding part is arranged on the second plate segment, the first sliding part is fitted with the first chute, the opening side of the first sliding part faces the bottom surface of the first chute, the second sliding part is arranged on the third plate segment, the second sliding part is fitted with the second chute, and the opening side of the second sliding part faces the bottom surface of the second chute.

7. The electronic device according to claim 6, wherein the first chute has a first inner wall surface and a second inner wall surface that are opposite to each other, the first inner wall surface is provided with a first limiting protrusion, the second inner wall surface is provided with a second limiting protrusion, the first sliding part has a first limiting groove and a second limiting groove arranged opposite to each other, the first limiting protrusion is fitted with the first limiting groove in a limiting manner, and the second limiting protrusion is fitted with the second limiting groove in a limiting manner; and the second chute has a third inner wall surface and a fourth inner wall surface that are opposite to each other, the third inner wall surface is provided with a third limiting protrusion, the fourth inner wall surface is provided with a fourth limiting protrusion, the second sliding part has a third limiting groove and a fourth limiting groove arranged opposite to each other, the third limiting protrusion is fitted with the third limiting groove in a limiting manner, and the fourth limiting protrusion is fitted with the fourth limiting groove in a limiting manner.

8. The electronic device according to claim 1, wherein the flexible display screen further comprises a support member, the edge of the support member extends to the edge of the display screen body, both the first guide member and the second guide member are connected to the display screen body through the support member, and in a direction perpendicular to the second part, an orthographic projection of the first guide member and an orthographic projection of the second guide member are both located within an orthographic projection of the support member.

9. The electronic device according to claim 8, wherein the support member comprises a rigid part, and when the flexible display screen is in the second state, the rigid part protrudes relative to the casing.

10. The electronic device according to claim 1, wherein the bottom frame is provided with a socket, and the socket and the second chute are arranged at intervals in the first direction.

\* \* \* \* \*